United States Patent
Guo et al.

(10) Patent No.: US 8,800,003 B2
(45) Date of Patent: Aug. 5, 2014

(54) TRUSTED DEVICE-SPECIFIC AUTHENTICATION

(75) Inventors: Wei-Qiang (Michael) Guo, Bellevue, WA (US); Yordan Rouskov, Kirkland, WA (US); Rui Chen, Kirkland, WA (US); Pui-Yin Winfred Wong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/162,834

(22) Filed: Jun. 17, 2011

(65) Prior Publication Data

US 2011/0247055 A1    Oct. 6, 2011

Related U.S. Application Data

(63) Continuation of application No. 12/131,142, filed on Jun. 2, 2008, now Pat. No. 7,979,899.

(51) Int. Cl.
*G06F 21/00*    (2013.01)
*G06F 21/31*    (2013.01)
*G06F 21/32*    (2013.01)
*G06F 21/34*    (2013.01)

(52) U.S. Cl.
CPC ............ *G06F 21/31* (2013.01); *G06F 21/32* (2013.01); *G06F 21/34* (2013.01)
USPC .......................................................... 726/4

(58) Field of Classification Search
CPC .......... G06F 21/31; G06F 21/32; G06F 21/34
USPC .......................................................... 726/4
See application file for complete search history.

(56) References Cited

U.S. PATENT DOCUMENTS 6,510,236 B1    1/2003   Crane et al.
7,181,507 B1    2/2007   Lavelle et al.
(Continued)

FOREIGN PATENT DOCUMENTS

JP    H10-260939       3/1997
JP    2004-258847      2/2003
JP    2005-323070 A   11/2005

OTHER PUBLICATIONS

International Search Report and Written Opinion Received for PCT Application No. PCT/US2009/042667, mailed on Jan. 25, 2010, 12 pages.

(Continued)

*Primary Examiner* — Chau Le
*Assistant Examiner* — Don Zhao
(74) *Attorney, Agent, or Firm* — Bryan Webster; Andrew Sanders; Micky Minhas

(57) ABSTRACT

An authentication system combines device credential verification with user credential verification to provide a more robust authentication mechanism that is convenient to the user and effective across enterprise boundaries. In one implementation, user credential verification and device credential verification are combined to provide a convenient two-factor authentication. In this manner, an account authority service or other authentication provider verify both factors and provide a security token in accordance with the security policy of the account network resource the user is intending to access. The level of privilege granted by the target account network resource can vary depending on the number and type of factors verified by the account authority service.

20 Claims, 6 Drawing Sheets

(56) References Cited

U.S. PATENT DOCUMENTS

| | | | |
|---|---|---|---|
| 7,350,074 B2 | 3/2008 | Gupta et al. | |
| 7,373,515 B2 | 5/2008 | Owen et al. | |
| 7,574,731 B2 | 8/2009 | Fascenda | |
| 7,610,617 B2 | 10/2009 | Kelly et al. | |
| 7,703,128 B2 | 4/2010 | Cross et al. | |
| 7,706,778 B2 | 4/2010 | Lowe | |
| 7,765,298 B2 | 7/2010 | Villavicencio | |
| 7,856,659 B2 | 12/2010 | Keeler et al. | |
| 2002/0112186 A1 | 8/2002 | Ford et al. | |
| 2003/0236991 A1* | 12/2003 | Letsinger | 713/200 |
| 2004/0187018 A1* | 9/2004 | Owen et al. | 713/200 |
| 2005/0023345 A1* | 2/2005 | Furuyama et al. | 235/382 |
| 2005/0091539 A1 | 4/2005 | Wang et al. | |
| 2006/0022048 A1 | 2/2006 | Johnson | |
| 2006/0070125 A1 | 3/2006 | Pritchard et al. | |
| 2006/0206709 A1 | 9/2006 | Labrou et al. | |
| 2006/0206924 A1 | 9/2006 | Wendling et al. | |
| 2006/0265598 A1 | 11/2006 | Plaquin et al. | |
| 2006/0282662 A1 | 12/2006 | Whitcomb | |
| 2007/0016941 A1* | 1/2007 | Gonzalez et al. | 726/9 |
| 2007/0056022 A1* | 3/2007 | Dvir | 726/4 |
| 2007/0067831 A1 | 3/2007 | Matsuda et al. | |
| 2007/0107050 A1 | 5/2007 | Selvarajan | |
| 2007/0136471 A1 | 6/2007 | Jardin | |
| 2007/0136472 A1 | 6/2007 | Jardin | |
| 2007/0186103 A1 | 8/2007 | Randle et al. | |
| 2007/0192601 A1 | 8/2007 | Spain et al. | |
| 2007/0198435 A1 | 8/2007 | Siegal et al. | |
| 2007/0220594 A1 | 9/2007 | Tulsyan | |
| 2007/0250920 A1* | 10/2007 | Lindsay | 726/7 |
| 2008/0046983 A1 | 2/2008 | Lester et al. | |
| 2008/0176536 A1 | 7/2008 | Galluzzo et al. | |
| 2008/0196088 A1 | 8/2008 | Vinokurov et al. | |
| 2009/0143104 A1 | 6/2009 | Loh et al. | |
| 2009/0199276 A1* | 8/2009 | Schneider | 726/5 |
| 2009/0228962 A1 | 9/2009 | Pathak | |
| 2010/0188975 A1 | 7/2010 | Raleigh | |
| 2010/0188992 A1 | 7/2010 | Raleigh | |
| 2010/0192212 A1 | 7/2010 | Raleigh | |
| 2011/0029782 A1 | 2/2011 | Havercan | |

OTHER PUBLICATIONS

"Authentication in an Internet Banking Environment", Federal Financial Institutions Examination Council, 2002, pp. 1-14.

"Managing Strong Authentication: A Guide to Creating an Effective Management System", Technology Brief: Identity and Access Management. 2007, 16 Pages.

Wuest, "Phishing in the Middle of the Stream"—Today's Threats to Online Banking. White Paper: Symantic Security Response. From the proceedings of the AVAR 2005 conference. 28 Pages.

Akira Goto, Japan Office Action 2011-511684, Feb. 24, 2012.

\* cited by examiner

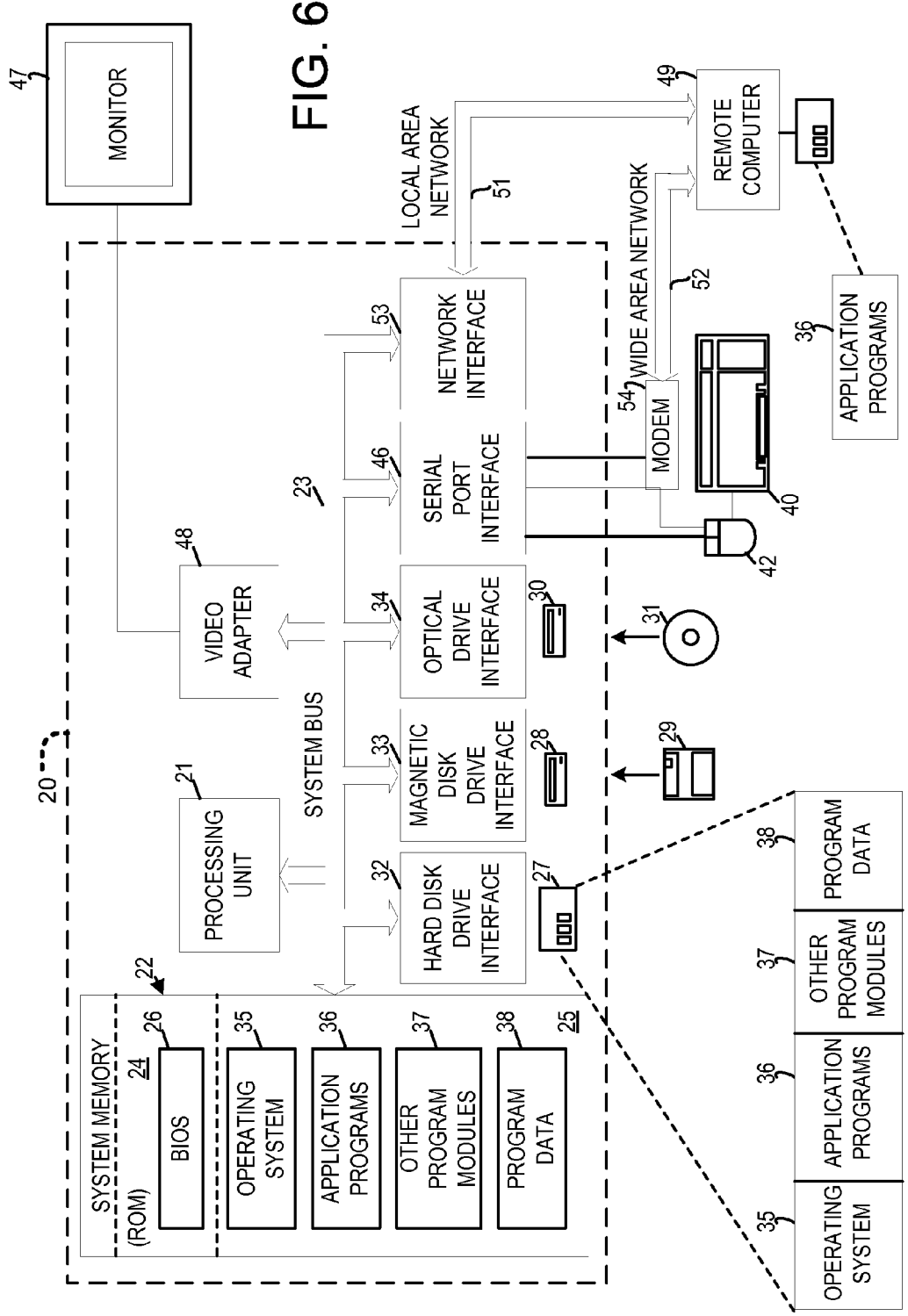

TRUSTED DEVICE-SPECIFIC AUTHENTICATION

CROSS-REFERENCE TO RELATED APPLICATIONS

This application is a continuation of pending U.S. patent application Ser. No. 12/131,142, entitled "Trusted Device-specific Authentication" and filed on Jun. 2, 2008, and related to pending U.S. patent application Ser. No. 12/131,140, entitled "Device-specific Identity" filed on Jun. 2, 2008, all of which are hereby incorporated into this application by reference in their entirety.

BACKGROUND

A typical user authentication mechanism verifies a user's credentials, such as by validating a username and password, as the user attempts to access a protected resource (e.g., a server accessed via the Internet). However, using such a traditional authentication mechanism, if the username and password are stolen by a malicious entity, the entity may access the user's account from anywhere in the world through any device, resulting in undesirable security risks.

Another authentication scenario involves a user attempting to login to a remote device. A user authentication mechanism can authenticate the user but it may also be relevant to make certain that the remote device is actually the trusted device the user expects it to be. For example, a user may attempt a login to a remote server in order to upload confidential files. If the authentication process does not verify both the user's credentials and the device's credentials, the user may upload the confidential files to the wrong server. The risk of being wrong about which device one is accessing introduces severe security risks.

SUMMARY

Implementations described and claimed herein address the foregoing problem by combining device credential verification with user credential verification to provide a more robust authentication mechanism that is convenient to the user and effective across enterprise boundaries. In one implementation, user credential verification and device credential verification are combined to provide a convenient two-factor authentication. Generally, the user provides the user credentials (e.g., username and password) while the user's device provides the device credentials that have been associated with both the user and the device. In this manner, an account authority service or other authentication provider verify both factors and provide a security token in accordance with the security policy of the account network resource the user is intending to access. If a required factor is not verified, the account authority service can request authentication by another factor (e.g., fingerprint scan, retina scan, HIP solutions, secret questions, etc.). The level of privilege granted by the target account network resource can vary depending on the number and type of factors verified by the account authority service.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

FIG. 6 illustrates an example system that may be useful in implementing the described technology.

DETAILED DESCRIPTIONS

Figure 1:
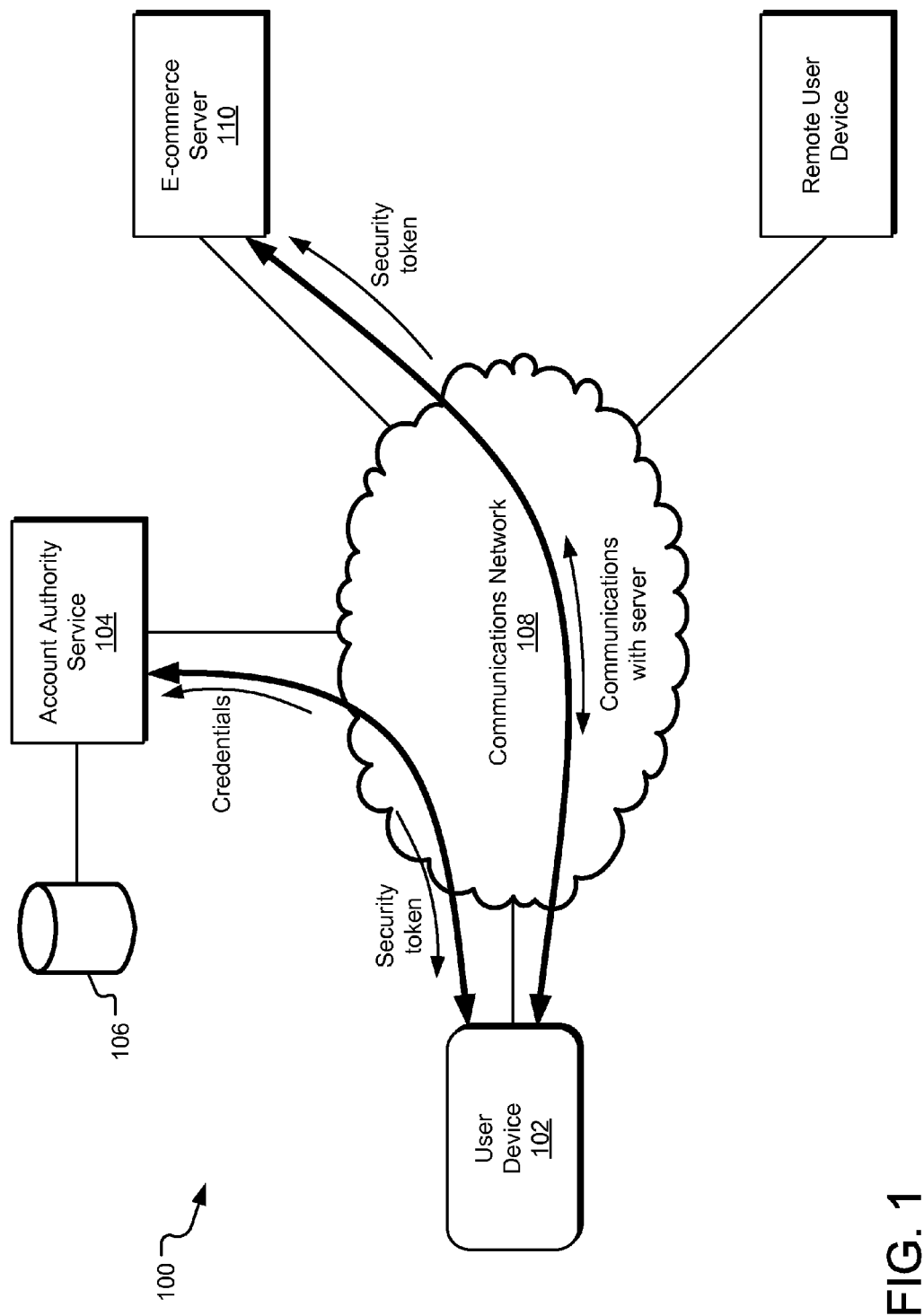
FIG. 1 illustrates an example system employing trusted device-specific authentication.

FIG. 1 illustrates an example system 100 employing trusted device-specific authentication. A user operates a user device 102 to communicate via a communications network 108 with an account authority service 104 in setting up a user account. In one implementation, the user account may be used to access a variety of network services or resources (collectively, "account network resources"). For example, by setting up an account with the account authority service 104, the user can configure a single set of credentials that can be used to access an email service, a calendaring service, an instant messaging service, a text messaging service, a blogging service, an online music service, a photosharing service, various e-commerce site, various remote devices, etc. within the account network. (The term "account network" refers to the network of account network resources that have trust relationships with an account authority service.) The account authority service 104 manages the initialization and maintenance of user accounts within an account network. The account authority service 104 also maintains a trust relationship with each of these account network resources so that each account network resource will allow users access based on identity representations (e.g., security tokens) provided by the account authority service 104. In one implementation, the account authority service establishes and maintains these trust relationships with account network resources based on a combination of contractual agreements, such as terms of use, security policies, and cryptographic keys that protect the communications between the account authority service and each account network resource.

Security tokens, for example, provide evidence of the identity of one or more entities (e.g., a user and/or a device) using a unique secret. By providing a security token to another entity, the providing entity is proffering evidence of its identity. It is up to the receiving entity to determine whether to authorize the providing entity with a level of privilege based on the security token. Further, a security token may have an expiration period, after which the security token is no longer reliable. In one implementation, a security token supports an API (Application Programming Interface) that allows a computing device to interrogate it (e.g., to determine whether the security token includes a username and/or a device ID). It should be understood that a username is an example of a user ID and that other user IDs may be employed. Other examples may include email addresses and aliases, including gamer tags.

In one implementation, the user provides user credentials (e.g., a username and user password) to set up an account, although other combinations of information may be employed to set up a user account. Account information is stored in a data repository 106 that is accessible by the account authority service 104. For example, an account record may include a username, password, one or more device IDs with their corresponding device passwords and user-friendly device name, among other data items. When a user attempts to log into his or her account, the account authority service 104 looks up the user's account information and verifies the user credentials against those stored in the account information. For example, the account authority service 104 looks up the user's account information using the provided username. Then, the account authority service 104 authenticates the user credentials (e.g., the username and password) to authorize access to the user's account.

Whether provided during account setup or afterward, device credentials (e.g., a device identifier (ID) and device password) may also be transmitted from the user device 102 to the account authority service 104 and stored as account information in association with user credentials. A device ID refers to a globally unique device identifier generated for the device. A device ID may be generated using a variety of methods. In one implementation, a device ID may be a randomly generated number such as Globally Unique Identifier (GUID) with a large value set so that one device ID does not conflict with another device ID. Another implementation may include consideration of unique characteristics of the device itself. For a personal computer device, for example, the combination of the hard disk and the BIOS offers some unique, non-volatile parameters or characteristics that may be used to contribute the device ID generation. Other characteristics may be related to user settings within the operating system that are generally not volatile. These non-volatile characteristics allow a closer affinity of the device ID to the actual device itself so that the device ID is less spoofable and easier to recover from a loss.

In one implementation, the user specifies that the user device 102 is a trusted device, and client software executing on the user device 102 generates a device ID and device password, which the user device 102 sends to the account authority service 104 as device credentials. The user may also provide a user-friendly device name in association with the device credentials so that the user (and potentially other users) can identify the user device 102 in the future.

In one implementation, the account authority service 104 records the device ID in the data repository 106 in association with the username to establish a trust relationship between the user and the user device 102. Through this process, the user has declared that the user device 102 is one of his or her trusted devices within the account network affiliated with the account authority service 104. It should be understood that the user may designate multiple trusted devices using a similar process.

Further the user may remove a device from his or her trusted device list in his account, which is useful when a device has been stolen and the user wishes to prevent authentication through the stolen device. For example, the user can send a request to the account authority service 104 to disassociate his or her user ID from a specified device ID. The account authority service 104 can, in response, delete the device ID of the specified device from the user's account or otherwise designate that the user ID is no longer associated with the device ID. This mechanism can be helpful, for example, when the user is updating his or her computer or mobile phone—e.g., a request through the older user device can specify "Remove this device from my trusted device list". However, in some circumstances, the user may no longer have the user device that is to be removed from the trusted device list (e.g., the user device has been damaged, lost, or stolen). In such circumstances, the user can request a list of his or her trusted devices, which can be listed by user-friendly device name, and select the device to be removed from this list. Alternatively, the user can merely provide the user-friendly device name in a removal request to the account authority service 104.

In one implementation, if the user has set up his or her account with the account authority service 104 so that the user is associated with the device ID of the user device 102, the user can request a device certificate associated with the user device 102. Generally, a device certificate is a digital certificate that binds a public key with a device ID. The device certificate provides evidence that the public key belongs to the device identified by the device ID. For example, the user may generate a public/private key pair and send the public key to the account authority service 104 along a reference to the device of interest (e.g., a user-friendly device name, the device ID, etc.). The public key is submitted with the device credentials and/or user credentials to ensure the certificate request is made by the trusted device and/or the user. The public key may be transmitted to the account authority service 104 contemporaneously with the account setup or at some other time thereafter. The account authority service 104 encrypts the device ID using the public key to create the device certificate, signs the device certificate using its private key, and sends the signed device certificate back to the user device 102. As a result of this transaction, the user device 102 possesses trusted evidence (e.g., the device certificate) that it is device identified by the device ID.

When the user wishes to initiate access to an account network resource, such as the e-commerce server 110, the user's browser can navigate to the e-commerce server 110, which redirects the user's browser to the account authority service 104. The user device 102 can provide user credentials and the device certificate to the account authority service 104 in a request for a security token to access the e-commerce server 110. In one implementation, a security token may include a username and/or a device ID, which an account network resource may access through an API. In one implementation, the account authority service 104 evaluates the user credentials, the device certificate, and the security policy of the e-commerce server 110 to determine whether to provide the user device 102 with a security token for access to the e-commerce server 110. Generally, the security policy defines what the server has defined as the terms of secure activity. The security policy addresses constraints on functions and flow among them, constraints on access by external systems and adversaries including programs and access to data by users. In another implementation, the account authority service 104 may also consider whether both the user credentials and device credentials have been authenticated, and if not, the account authority service 104 may withhold the security token. This withholding may be performed in accordance with the network service's security policy or dictated by the account authority service itself.

If the user device 102 receives the security token, it forwards the security token to the e-commerce server 110, which evaluates the security token before allowing the user access under a determined level of privilege. If the user is allowed access to the e-commerce server 110, communications between the user device 102 and the e-commerce server 110 may ensue under the terms of the server's security policy and the user's privilege level.

Multiple-factor authentication (e.g., two factor authentication) can provide stronger security over single factor authentication. In one implementation, the multiple factors may include user credentials plus trusted device credentials, although other combinations of factors may be employed in multiple-factor authentication. Multiple-factor authentication tends to be stronger because a user's name and password alone can be easily phished or stolen but the physical, trusted device that the user employs to access the account network resource is more difficult for a malicious user to obtain and operate. Furthermore, different security decisions can be made depending on whether the trusted device factor is authenticated in addition to the user factor. For example, a security policy may notify the user if an attempt is made to login from a non-registered device, require that changes to a user's password be made only through a trusted device, set a security token with a shorter expiration if the trusted device factor is not authenticated, etc.

In one implementation, the e-commerce server 110 may offer a user different privilege levels depending on whether the trusted device factor is authenticated. For example, a user who authenticates with both user credentials and device credentials (e.g., as represented by a device certificate) may be given additional storage or may experience fewer human interactive prompts (HIP) or other security prompts than a user who authenticates only with user credentials.

For additional security for the user account, the account authority service 104 can block attempts to change the user credentials and/or the device credentials if the user is unable to obtain verification of both user credentials and device credentials of a trusted device. Practically, this feature can prevent a user with a valid username/password from changing user account information through the account authority service 104 if the user is not accessing the account authority service 104 through a trusted device. Alternatively or additionally, the user may be notified of an attempt to change the user account information if the user requesting the change was unable to obtained verification of both user credentials and device credentials of a trusted device.

Figure 2:
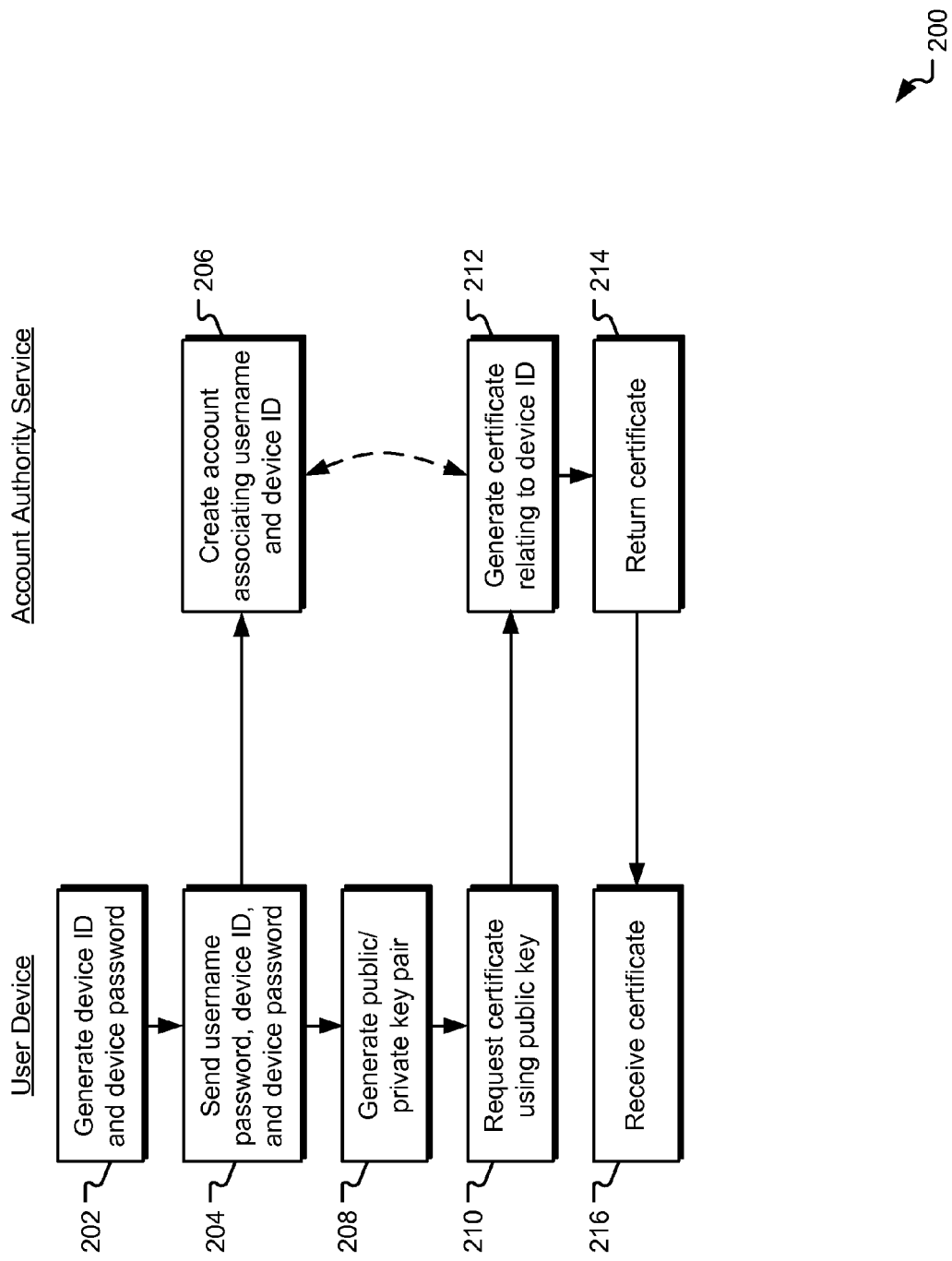
FIG. 2 illustrates example operations and communications for generating a trusted device-specific certificate.

FIG. 2 illustrates example operations and communications (collectively at 200) for generating a trusted device-specific certificate. The communications represent data transmissions, typically over a communications network, between a user device and a computing system operating an account authority service.

In one implementation, client software on the user device generates a device ID and device password ("device credentials"), both associated with the user device, in a generation operation 202. The user may also provide a user-friendly device name in association with the device ID. The user device collects and sends a username/password and device ID/password (and potentially, a user-friendly device name) to the account authority service in a transmission operation 204 in association with a request to create an account. In response to the request, the account authority service creates an account for the user in a creation operation 206, associating the username with the device ID and recording both in the account information stored in a datastore accessible by the account authority service. Both the user password and the device password may also be stored in the account information, typically with cryptographic protection.

It should be understood that the username and device ID may be associated under other circumstances as well. For example, the user's account may already be created, such that the user subsequently provides the device credentials for association in the previously created account. Furthermore, the username can be associated with multiple trusted device IDs and those associations can be recorded in the account information.

In a generation operation 208, the user device generates a public/private key pair. In a request operation 210, the user device requests a certificate associated with the trusted device. In one implementation, the user device sends the user-friendly device name and public key to the account authority service. In an alternative implementation, the user device could alternatively also send the username/password to ensure that the request is initiated by the user from the trusted device with higher security assurance.

In a generation operation 212, the account authority service builds the device ID and public key into a device certificate and then signs the certificate using the account authority service's private key to bind the user device's public key to the device ID. In this manner, an entity wishing to confirm that the device ID belongs to the user device can then evaluate the certificate, using the account authority service's public key to verify its digital signature.

In one implementation, a user can designate multiple devices as "trusted". Accordingly, each device ID of a trusted device is recorded in the account information in association with the user's username and with the user-friendly name. In this manner, the user identifies the device he or she wishes to designate as "trusted" by provided the user-friendly device name. When requesting a device certificate, the user can provide the user-friendly device name, so that the account authority service can find and access the user's account and extract the device ID corresponding to the provided user-friendly device name. The account authority service then builds the device ID and public key into a device certificate, which it signs using its own private key.

The account authority service returns the generated device certificate to the user device in a return operation 214. The user device receives the device certificate in a receiving operation 216. The user device can later use the device certificate as evidence that it is the device identified by the device ID.

Figure 3:
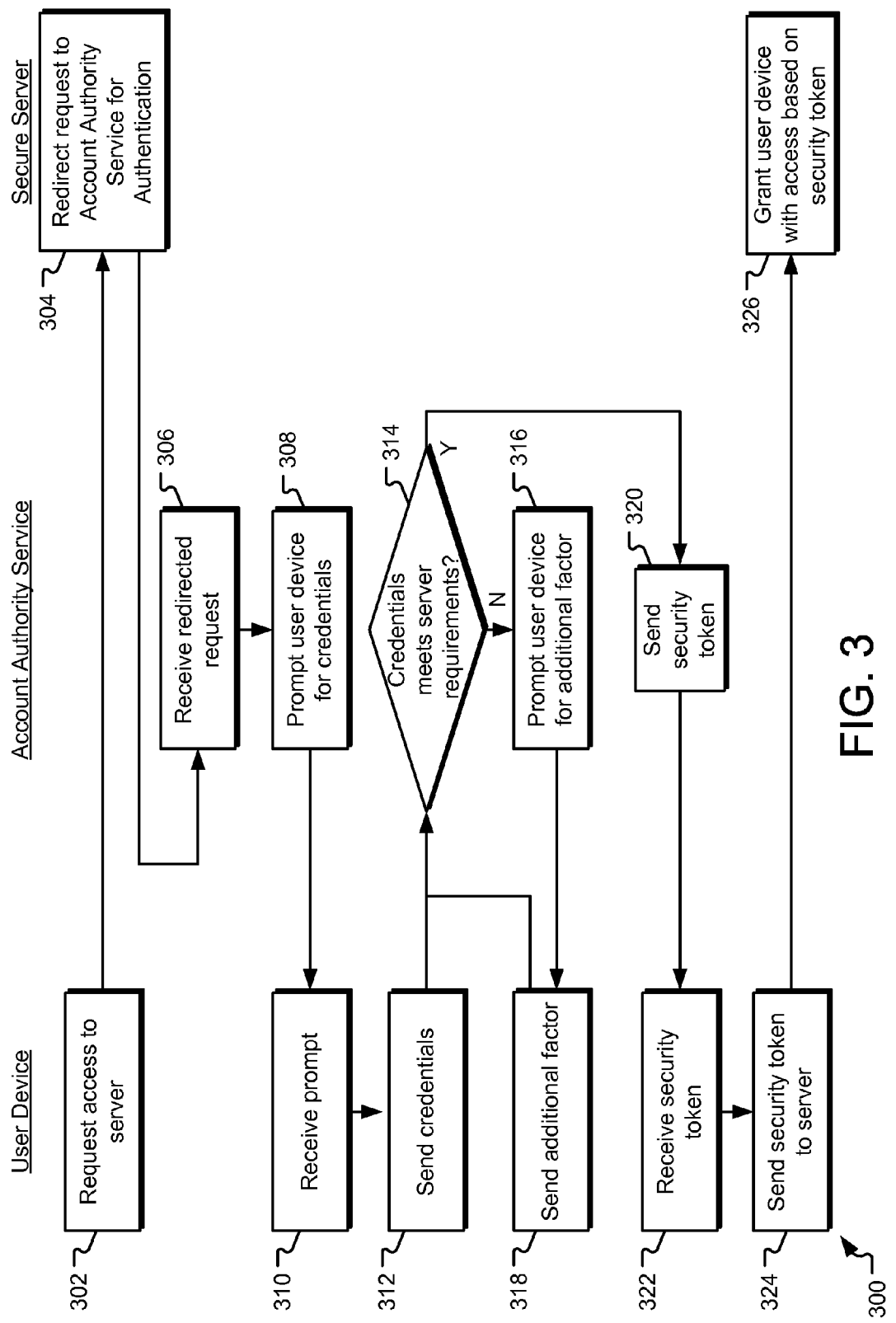
FIG. 3 illustrates example operations and communications for accessing a secure server using trusted device-specific authentication.

FIG. 3 illustrates example operations and communications (collectively at 300) for accessing a secure server using trusted device-specific authentication. In this example, assume a user wishes to access the secure server from his or her user device. The secure server is in a trust relationship with the account authority server, upon which it depends for authentication of users and devices. Within this trust relationship, the account authority service has knowledge of the security policies of the secure server and enforces said policies when it is asked to authenticate a user and/or device for access to the secure server. Depending upon whether the user provides both user credentials and device credentials, or just user credentials, the level of privilege authorized by the account authority service to the user for access to the secure server can vary. For example, authentication by both user credentials and device credentials may result in the account authority service granting a higher level of privilege to the user than for authentication by user credentials only.

In the illustrated flow, the user requests access to the secure server in a request operation 302 (e.g., by navigating a browser to a web page served by the secure server). The secure server device detects that the user has not yet been authenticated for access by the account authority service (e.g., the user's access request did not contain a security token for access to the secure server) and therefore redirects the user to the account authority service for authentication in a redirection operation 304.

The account authority service receives the redirected request (which includes an identification of the secure server that redirected the request) in a receiving operation 306. A prompting operation 308 at the account authority service prompts the user for credentials. The user device receives the prompt at a receiving operation 310 and submits credentials in a sending operation 312. The user may submit his or her user credentials (e.g., username and password), which is typical. In an alternative scenario, the user device may also submit a device certificate (or device ID and device password), thereby providing two factors for authentication.

As a part of the trusted relationship between the account authority service and the secure server, the account authority service knows the secure server's security policies. Accordingly, when the account authority service receives the credentials from the user device, it authenticates them and, if the credentials satisfy the secure server's security requirements (as determined in a decision operation 314), the account authority service sends a security token to the user device in an operation 320.

If the user-device-supplied credentials do not satisfy the security requirements of the secure server, the account authority service 316 may prompt the user device for addition credentials. For example, if the secure server requires a two-factor authentication, such as both user and device credentials, the account authority server may require the user to authenticate via a trusted device. Alternatively, if the device ID factor is not satisfied, the secure server may accept alternative second factors, such as HIP solutions, secret question responses (e.g., "Mother's maiden name"), etc.

In other scenarios, the authentication granted by the account authority service may be diminished in some way if the required number of factors is not satisfied. For example, the account authority service may provide a security token that expires more quickly if no second factor authentication is achieved.

The user device receives the security token in receiving operation 322 and forwards it to the secure server in a sending operation 324. In a granting operation 326, the secure server interrogates the security token to determine a level of privilege to authorize for the user/device, based on the authentication performed by the account authority service. In one implementation, the secure server interrogates the security token to determine whether both user credentials and device credentials were included in the authentication with the account authority service. If so, the secure server can allow a higher level of privilege to the user via the user device. Otherwise, the secure server can allow a lower level of privilege to the user or allow not access at all.

Figure 4:
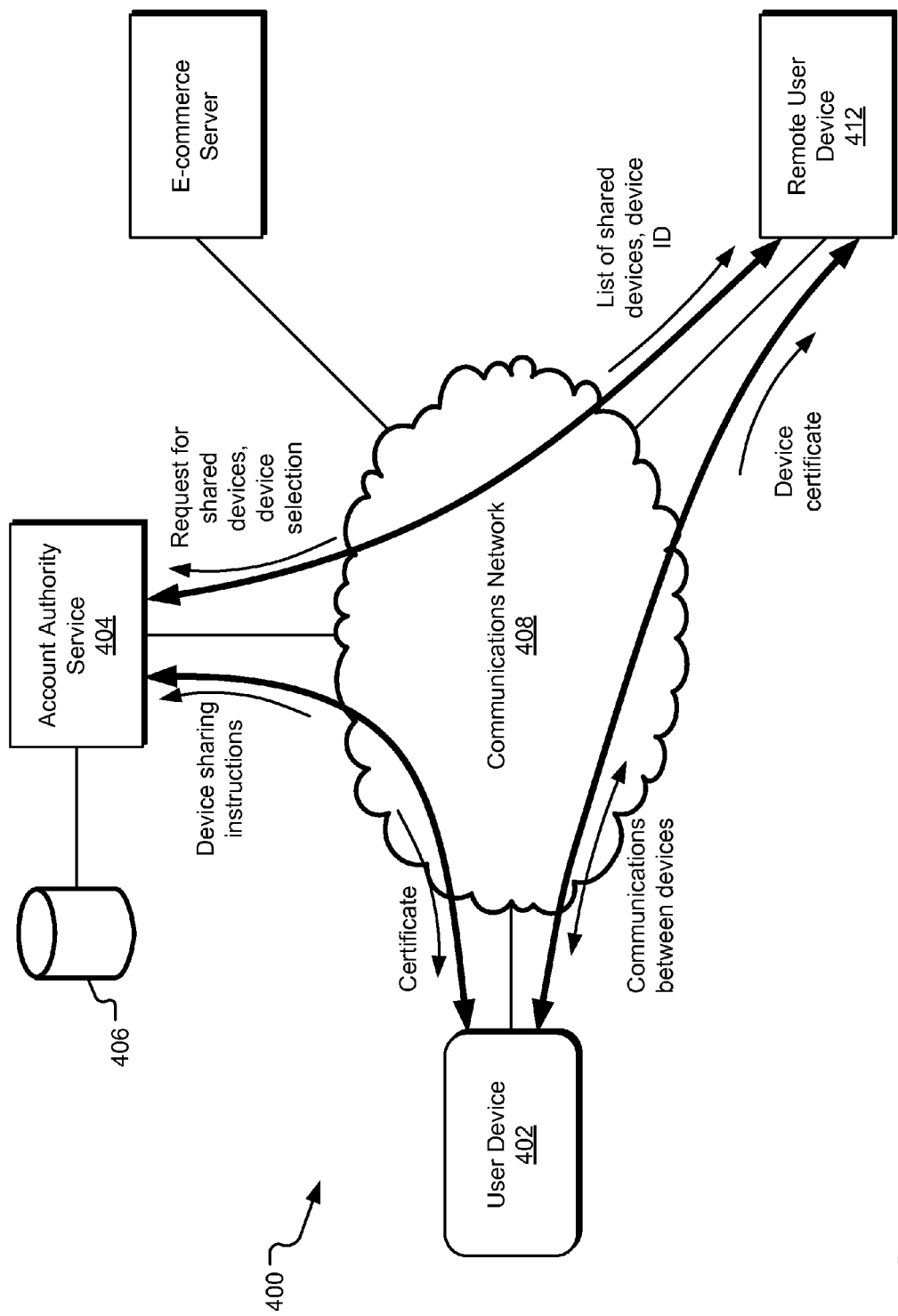
FIG. 4 illustrates an example system providing remote device access based on trusted device-specific authentication.

FIG. 4 illustrates an example system 400 providing remote device access based on trusted device-specific authentication. A user operates a user device 402 to communicate via a communications network 408 with an account authority service 404 in setting up a user account. In one implementation, the user account may be used to access a variety of account network resources. For example, by setting up an account with the account authority service 404, a user operating the user device 402 can publish a list of trusted devices he or she is willing to share with other users, such as a remote user via a remote user device 412. The account authority service 404 manages the initialization and maintenance of user accounts within an account network. The account authority service 404 also maintains a trust relationship with the user, the user device, and with other users and devices coupled to the account network.

In one implementation, the user provides user credentials (e.g., a username and user password) to set up an account, although other combinations of information may be employed to set up a user account. Account information is stored in a data repository 406 that is accessible by the account authority service 404. When a user attempts to log into his or her account, the account authority service 404 looks up the user account information and verifies the provided user credentials against those stored in the account information.

Whether provided during account setup or afterward, device credentials (e.g., a device identifier (ID) and device password) may also be transmitted from the user device 402 to the account authority service 404 and stored as account information in association with user credentials. In one implementation, the user specifies that the user device 402 is a trusted device, and client software executing on the user device 402 generates a device ID and device password, which the user device 402 sends to the account authority service 404 as device credentials. The user may also provide a user-friendly device name so that the user (and potentially other users) can identify the user device 402 in the future.

The user can also designate the user device 402 as accessible by another remote user by publishing device sharing instructions. In one implementation, the user sets a sharing parameter in his or her account information identifying the user device 402 as accessible by other users. In another implementation, the user may also specify as sharing parameters the remote users with whom he or she wishes to share the device and at what level of privilege. The sharing parameter is associated with the device ID, which the account authority service 404 receives from the user device 402. The account authority service 404 may also add the sharing parameter to a certificate and sign the certificate before returning the certificate back to the user device 402.

In one implementation, the account authority service 404 records the device ID and sharing parameters in the data repository 406 in association with the username to establish a trust relationship between the user and the user device 402. Through this process, the user has declared that the user device 402 is one of his or her trusted devices within the account network affiliated with the account authority service 404.

In one implementation, if the user has set up his or her account with the account authority service 404 so that the user is associated with the device ID of the user device 402, the user can request a device certificate associated with the user device 402. The user generates a public/private key pair and sends the public key to the account authority service 404 along a reference to the device of interest (e.g., a user-friendly device name, the device ID, etc.). The public key may be transmitted to the account authority service 404 in combination with the account setup or at some other time thereafter. The account authority service 404 encrypts the device ID using the public key to create the device certificate and sends the device certificate back to the user device 402. As a result of this transaction, the user device 402 possesses trusted evidence (e.g., the device certificate) that it is device identified by the device ID.

When another remote user attempts to connect with the user device 402 through the remote user device 412, the remote user device 412 requests from the account authority service 404 a list of shareable devices associated with the first user (e.g., as identified by the first user's email address, gamer tag, username, etc.). The account authority service 404 looks up the first user's account information, determines which of the user's devices are published as shareable and whether the requesting remote user is authorized for sharing the devices. If the remote user is so authorized, the account authority service 404 returns a list of shareable devices associated with the first user and available for sharing by the remote user. The remote user can select one of the shareable devices, returning the selection to the account authority service 404. The account authority service 404 then extracts the selected device's device ID from the user's account information and returns the device ID of the selected device to the remote user device 412. The information returned to the remote user device 412 may include the public key and IP address of the user device 402.

Having obtained the device ID of a selected shareable device from the trusted account authority service 404, the remote user device 412 can connect to the user device 402. In one implementation, the connection is achieved through standard networking protocols, such as TCP/IP with the IP address for the user device 402. When the remote user device 412 achieves connection to the user device 402, it requests the device certificate from the user device 402 and verifies the signature made by the account authority service 404. (In this manner, the remote user device 412 can obtain the public key of the user device 402. It may also obtain the public key of the user device 402 from the account authority service 404.)

The remote user device 412 also requests that the user device 402 provide that it knows the private key that matches to the public key of the user device 402. Methods of providing may be accomplished through standard protocols, such as SSL, but other methods may also be employed. In one implementation, the user device 402 goes through a network challenge and response handshake with the remote user device 412, which results in the user device 402 signing and/or encrypting some data with its private key. The remote user device 412 can then verify the data using the public key of the user device 402. By verifying that the user device 402 truly possesses the private key, the remote user device 412 has confirmed that it has connected to the device to which it intended to connect and the devices can safely continue to communicate accordingly. If verification fails, the remote user device 412 can break the connection before providing information to or granting access to the wrong device.

In one implementation, the user device 402 may also request that the remote user device 412 send its security token (received from the account authority service 404 so that the user device 402 can be assured of the identity of the remote user device 412. The security token can also be a public/private key pair in a certificate format and the device 402 would go through a similar process of verifying the signature and obtaining the proof of private key possession by the remote user device 412.

Figure 5:
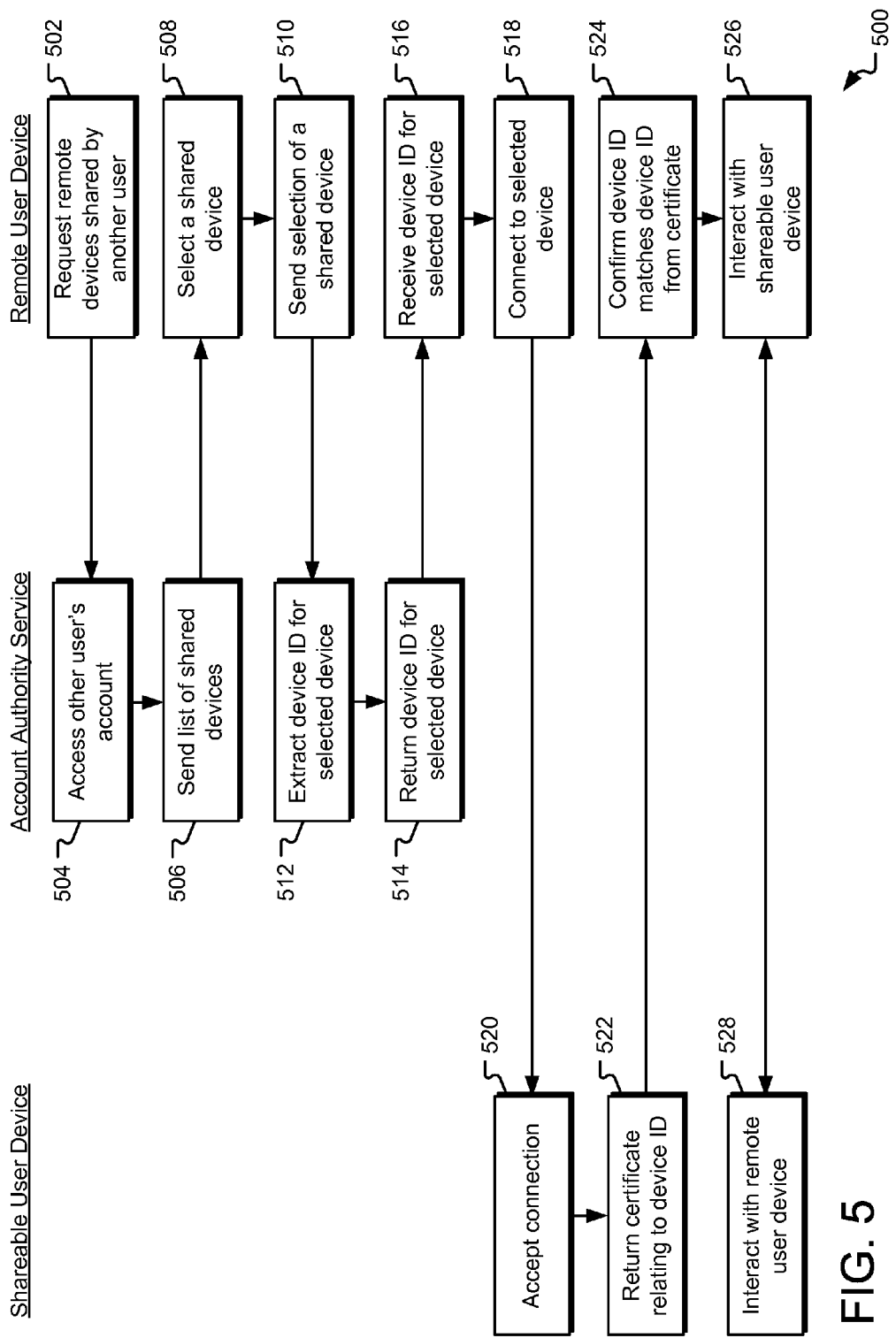
FIG. 5 illustrates example operations and communications for providing remote device access based on trusted device-specific authentication.

FIG. 5 illustrates example operations and communications (collectively at 500) for providing remote device access based on trusted device-specific authentication. In a discovery request operation 502, a remote user requests (via a remote user device) from the account authority service a list of shareable devices associated with another user, designating the user using a user identifier, such as the user's email address, gamer tag, username, etc. In a discovery list operation 504, the account authority service receives the request and accesses the specified user's account to obtain the list of shareable devices associated with the specified user. The account authority service collects the device names, typically user-friendly device names initiated by the specified user, into a list and sends the list back to the remote user device in a sending operation 506.

The remote user can review the shareable device list and select the device of interest in a selection operation 508. In a sending operation 510, the remote user device returns the selection of the shareable device to the account authority service. The account authority service accesses the account information of the other user to extract the device ID for the selected device in an extraction operation 512 and returns it to the remote user device in a sending operation 514. The remote user device receives the device ID in a receiving operation 516.

The remote user device connects to the selected device in a connection operation 518. As previously described, this connection may be obtained through standard networking protocols, such as TCP/IP, although other methods may be employed. The shareable user device accepts the connection in a connection operation 520 that also proves the possession of the user device's private key. The remote user device receives the claim of the possession of the private key (e.g., a device certificate) and confirms that the user device's private key was used in the claim of the possession of the private key. This validation mechanism may be implemented based on a private/public key pair (e.g., via SSL). The remote user device may also confirm the account authority's signature on the device certificate.

If the remote user device is able to confirm the identity of the shareable user device via the device ID, the remote user device is assured that the device to which it is connected is the device it selected from the list of shareable devices. As such, the remote user device and the shareable user device can interaction in operations 526 and 528. If the remote user device cannot confirm the identity of the shareable user device as the device with which it intended to connect, it can terminate the connection to reduce the chance of a security breach.

The example hardware and operating environment of FIG. 6 for implementing the invention includes a computing device, such as general purpose computing device in the form of a gaming console or computer 20, a mobile telephone, a personal data assistant (PDA), a set top box, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via a display interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, an account authority service module and other modules may be embodied by instructions stored in memory 22 and/or storage devices 29 or 31 and processed by the processing unit 21. A usernames, passwords, device identifiers, certificates, security tokens, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method of performing multiple-factor authentication of a user of a device within an account network, the method comprising:

accessing a user credential stored by an account authority service of the account network, the user credential comprising a user identifier and a corresponding password, the account authority service comprising a network service that provides account authorization services via a network to users of the account network;

receiving and storing via the network, at the account authority service, a device credential for the device and association information indicating that the device credential is to be associated with the user credential, the device credential comprising an identifier and a corresponding device password, the account authority service responding to the association information by storing an association between the device identifier and the user identifier, wherein the device credential is employed by the user to access the account network, the association representing a trust relationship between the user and the device;

when accessing the account network by the device, receiving the device credential and user credential via the network from the device at the account authority service and in response attempting to verify the user credential and the device credential; and generating a security token and sending the security token to the device to be used to access the account network, wherein the security token is configured by the account authority service to comprise an indication of a level of privilege granted by the account authority service in accordance with the attempting to verify the user credential and the device credential, the granted level of privilege when the user credential is successfully verified being dependent upon whether the device credential is successfully verified, the level of privilege used by servers of the account network to determine which resources are to be accessible on the servers of the account network.

2. The method of claim 1 wherein the security token is based on evidence of verification of both the user identifier and the device identifier.

3. The method of claim 1 further comprising:
associatively recording the user identifier and the device identifier in an account of the user within the account network that is managed by the account authority service.

4. The method of claim 1 further comprising:
recording the user identifier and the device identifier and at least one other device identifier corresponding to another device, the recording operation designating devices identified by the device identifier and the at least one other device identifier as trusted devices of the user.

5. The method of claim 1 wherein the security token includes both the user identifier and the device identifier.

6. The method of claim 1 wherein the security token comprises evidence of identity of the user, and wherein the security token includes an interface allowing a recipient of the security token to access both the user identifier and the device identifier from the security token.

7. The method of claim 1 further comprising:
disassociating the user identifier from the device identifier to remove the device as a trusted device of the user.

8. The method of claim 1 wherein the generating operation provides evidence of identity only upon successful verification of both the user credential and the device credential, and further comprising:
withholding the evidence of identity of the user if verification of both the user credential and the device credential is unsuccessful.

9. The method of claim 1 further comprising:
blocking an attempt by the user to change the user credential and the device credential if the user credential is successfully verified but the device credential is not successfully verified.

10. The method of claim 1 further comprising:
notifying the user that an attempt to authenticate using the user credential resulted in successful verification of the user credential but not successful authentication of the device credential.

11. The method of claim 1 wherein the level of privilege when the device credential is determined to be verified the level of privilege grants access to at least some resources that are accessible when the device credential is verified, and when the device credential is not successfully verified the level of privilege does not grant access to the some of the resources but does grant access to other resources based on the verification of the user credential.

12. One or more computer readable storage devices having computer-executable instructions to enable a computer process to perform multiple-factor authentication of a user within an account network, the account network having an authorization service that manages user accounts of users of the account network and that verifies requests, received via a network, of the users of the account network to access servers in the account network, the computer process comprising:
receiving via the network, by the authorization service, a request initiated by a device to associate a device identifier of a device credential with a user identifier of a user credential of the user, the device credential corresponding to the device and employed by the user to access the account network, the device operated by the user;
responsive to the request, configuring an account of the user to comprise an association between the user identifier and the device identifier, the association representing a trust relationship between the user and the device;
responsive to an access request by the device, evaluating a credential from the device against the user credential and the device credential to generate verification results; and
according to the verification results, generating a token usable by the device to access the servers in the account network, wherein the token is generated to comprise an indication of a first privilege granted when the user credential and the device credential have been verified, and wherein the token is generated to comprise an indication of a second privilege when the user credential is verified and the device credentials has not been verified.

13. The one or more computer readable storage devices of claim 12 wherein the token includes both the user identifier and the device identifier.

14. The one or more computer readable storage devices of claim 12 wherein the configuring operation comprises:
recording the user identifier and the device identifier and at least one other device identifier.

15. The one or more computer readable storage devices of claim 12 wherein the generating operation comprises:
adding the user identifier and the device identifier to the token.

16. The one or more computer readable storage devices of claim 12 wherein the generating operation comprises:
including with the token an interface allowing a server to access both the user identifier and the device identifier from the token.

17. The one or more computer readable storage devices of claim 12 wherein the first privilege is higher than the second privilege.

18. A method of authorizing a user with a level of privilege for accessing an account network resource, the method comprising:
receiving, via a network, evidence of identity from a device through which the user is attempting to access the account network resource;
interrogating the evidence of identity to determine whether the evidence of identity indicates successful verification of both a user credential of the user and a device credential& of the device by an authentication provider trusted by the account network resource, the authentication provider comprising a network service used by users of the account network resource for authentication over the network;
generating a first token granting a first level of privilege to the user when using the device within the account network if the evidence of identity indicates successful verification of both the user credential of the user and the device credential of the device by the authentication provider; and generating a second token granting a second level of privilege to the user using the device within the account network if the evidence of identity indicates successful verification of the user credentials and unsuccessful verification of the device credentials of the device by the authentication provider.

19. The method of claim 18 wherein the first level of privilege is higher than the second level of privilege and authorizes access to resources not authorized by the second level of privilege.

20. The method of claim 18 wherein the first and second tokens provide a programming interface through which the account network resource can access a user identifier of the user credential and a device identifier of the device credential.

* * * * *